United States Patent [19]

Tick

[11] 4,426,430
[45] Jan. 17, 1984

[54] INORGANIC NBF$_5$(TAF$_5$)-P$_2$O$_5$ ELECTROLYTES

[75] Inventor: Paul A. Tick, Corning, N.Y.

[73] Assignee: Corning Glass Works, Corning, N.Y.

[21] Appl. No.: 441,119

[22] Filed: Nov. 12, 1982

[51] Int. Cl.$^3$ .............................................. H01M 4/36
[52] U.S. Cl. ................................... 429/103; 429/193; 429/199; 252/62.2; 501/44
[58] Field of Search ............... 429/193, 191, 103, 199; 252/62.2; 501/44, 45

[56] References Cited

U.S. PATENT DOCUMENTS 4,314,031 2/1982 Sanford et al. ...................... 501/44

Primary Examiner—Charles F. LeFevour
Attorney, Agent, or Firm—K. van der Sterre

[57] ABSTRACT

Compositions in the NbF$_5$(TaF$_5$)-P$_2$O$_5$ system which are liquid at room temperature and exhibit relatively high ionic conductivities, useful for example, as electrolytes in batteries or other electrochemical cells, are described.

4 Claims, 1 Drawing Figure

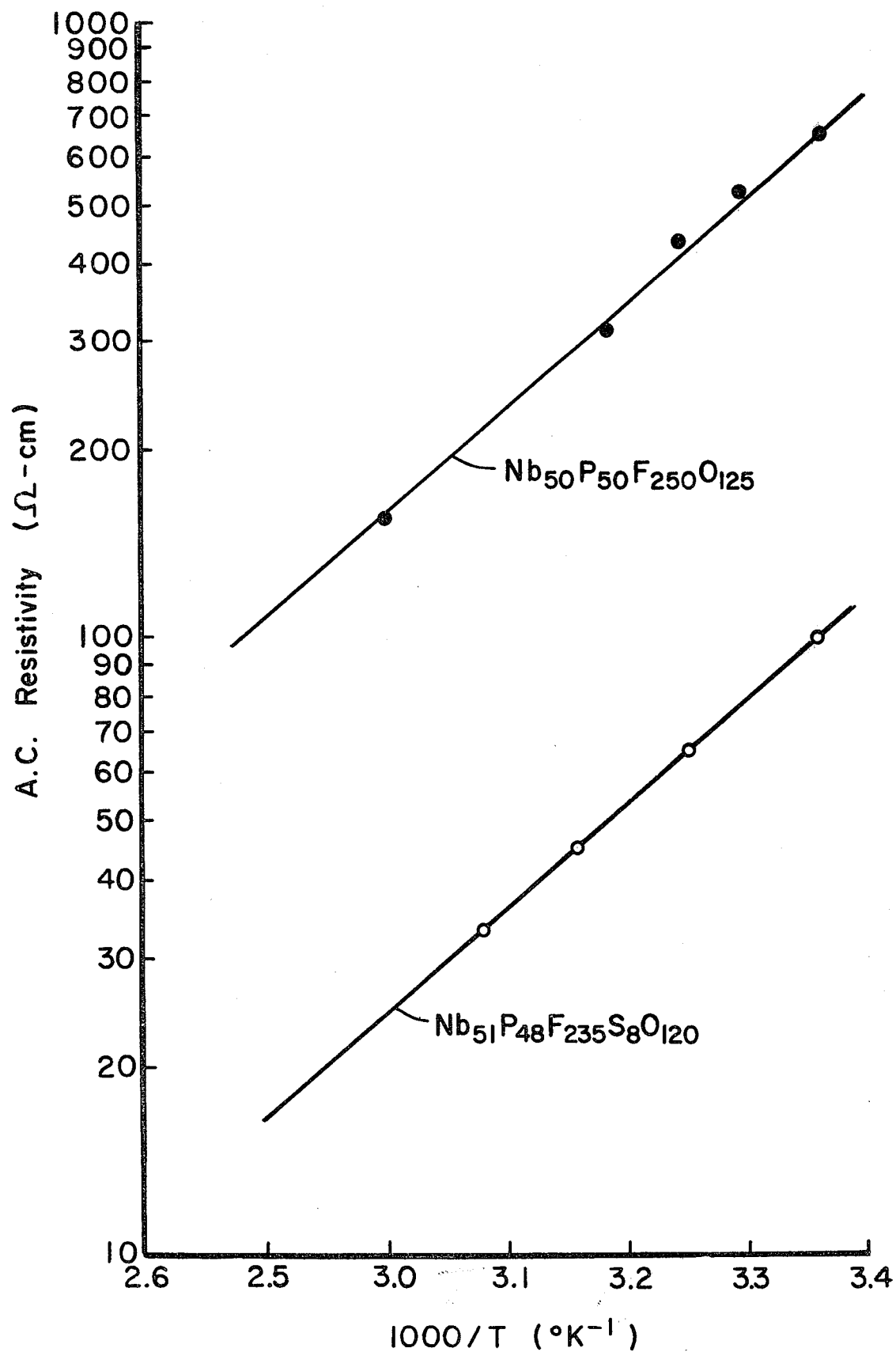

4,426,430

INORGANIC NBF₅(TAF₅)-P₂O₅ ELECTROLYTES

BACKGROUND OF THE INVENTION

The present invention relates to ionically conductive materials useful for electrochemical cell electrolytes or the like, and particularly to a new fused salt system which is molten and exhibits good conductivity at low temperatures.

Pentavalent metal fluorides are very low-melting, hygroscopic compounds which readily form eutectics with other fluoride salts. Many of these are liquid at or near room temperatures. See, for example, Ray W. Thoma, *Advances in Molten Salt Chemistry*, Vol 3, Chapter 6 (phase diagrams of binary and ternary fluoride systems). The melting temperatures of $SbF_5$, $TaF_5$, and $NbF_5$ are all below 100° C., with $SbF_5$ exhibiting a boiling point below 150° C.

Unfortunately, the reactivity of these fluoride salts with water makes them very difficult to work with. Accordingly, few practical applications involving all-fluoride systems have been pursued.

$P_2O_5$ has recently been found to be useful in the formation of oxyfluoride glasses exhibiting very low softening temperatures. U.S. Pat. No. 4,314,031 discloses examples of such glasses, based on combinations of $SnF_2$ and $P_2O_5$, which exhibit glass transition temperatures below 100° C.

SUMMARY OF THE INVENTION

The present invention is founded on the discovery of a region of composition in the $NbF_5$-$P_2O_5$ composition system wherein the constituents react to form a stable, ionically conductive liquid phase at room temperature. These liquids are found to be ionically rather than electronically conducting, and while the current carrying species has not been positively identified, it is likely that fluorine or a fluoride complex is involved. Such characteristics make these compositions interesting candidates for electrolytes in batteries or other electrochemical cells.

Broadly, compositions in accordance with the invention offering a combination of low melting temperature and low electrical resistivity are those comprising, in weight percent, about 65–95% of one or more pentavalent metal fluorides selected from the group consisting of $NbF_5$ and $TaF_5$, 5–25% $P_2O_5$, and at least about 85% total of $NbF_5+TaF_5+P_2O_5$. Optional constituents which may be introduced into the composition without adverse effects on properties include up to about 15% total of halogens selected from the group Cl, Br and I, up to about 2% total of elements selected from the group consisting of B and Li, and up to about 3% S. Hydrogen, which may be present as water in commercially available $NbF_5$ starting materials, can be present in amounts as high as 2% of the total batch weight.

A conductivity cell including a pair of platinum electrodes and a cell electrolyte consisting of a molten $NbF_5$-$P_2O_5$ composition within the above-described composition range exhibited conductivity characteristics suggesting that the electronic component of conductivity of these electrolytes is quite small. An electrochemical battery cell incorporating one such electrolyte demonstrated an open circuit voltage as high as 4.1 volts, versus a theoretical value of 4.87 volts for the particular cell configuration tested.

DETAILED DESCRIPTION

Niobium pentafluoride, the preferred pentavalent fluoride for use in the compositions of the invention, is a hygroscopic salt melting at about 72° C. It is typically supplied in the form of a grey powder, packed under an inert gas, which may be either dry or partially hydrated as received. To prepare compositions including this salt without introducing additional water, it is desirable to use a glove box filled with dry nitrogen to compound the batches and, if possible, to melt the batches under dry nitrogen.

Table I below sets forth examples of binary $NbF_5$-$P_2O_5$ compositions which can be prepared and melted under dry nitrogen to provide fused salt mixtures exhibiting good fluidity and conductivity at room temperature.

TABLE I

| Melt Number | Composition (Weight %) $NbF_5$ | $P_2O_5$ | Melt Appearance | A.C. Resistivity (ohm-cm) |
|---|---|---|---|---|
| 1 | 75.4 | 24.6 | amber fluid | 229 |
| 2 | 79.7 | 20.3 | amber fluid | 625 |
| 3 | 81.6 | 18.4 | amber fluid | 714 |

Compositions such as above described are readily melted at temperatures in the range of about 90°–280° C., typically 140°–160° C., and the melts are normally clear and of good quality. Teflon ® fluorocarbon-lined containers constitute suitable vessels for melting such compositions.

The electrical resistivities reported in Table I are room temperature values which are determined in a conductivity cell between platinum electrodes. Because of cell polarization under d.c. fields, a.c. conductivity measurements are used to determine the electrical resistivities of the fluids; the values reported in Table I are those determined at 10 KHz.

Compositions containing $TaF_5$ in place of $NbF_5$ can also be melted to provide ionically conductive liquids, although the conductivity of these liquids is not as high and some of the compositions are waxy solids rather than liquids at room temperature. Table II below reports two illustrative compositions in this system, the appearances being those exhibited at room temperature.

TABLE II

| Melt Number | Composition (Weight %) $NbF_5$ | $P_2O_5$ | Melt Appearance | A.C. Resistivity (ohm-cm) |
|---|---|---|---|---|
| 4 | 85.6 | 14.4 | grey melt; suspended particles | — |
| 5 | 94.3 | 5.7 | waxy solid | $52 \times 10^3$ |

The water content of the fluoride salt can have important effects on the melting characteristics of these compositions and the properties of the resultant fluid electrolytes. Compositions exhibiting properties such as reported in Table I were compounded using freshly opened, dry $NbF_5$ purchased from Cerac, Inc., Milwaukee, Wis., 53201, and having a negligible water content. With this salt, nearly all of the starting materials will go into the melt with the exception of a thin, transparent surface skin, although difficulty may be encountered in melting compositions containing more than about 82 weight percent $NbF_5$.

Table III below reports compositions melted with $NbF_5$ which had been obtained from the same source, but which had been permitted to age for several months prior to use. Chemical analysis of this starting material indicated that 0.1–0.2% hydrogen (expressed as water) was present.

TABLE III

| Melt Number | Composition (mole %) $NbF_5$ | $P_2O_5$ | Melt Appearance | A.C. Resistivity (ohm-cm) |
|---|---|---|---|---|
| 6 | 75.4 | 24.6 | amber fluid | — |
| 7 | 88.7 | 11.3 | amber fluid | $4.8 \times 10^3$ |
| 8 | 89.8 | 10.2 | amber fluid | $10^3$ |
| 9 | 93.6 | 6.4 | amber fluid | $10^3$ |
| 10 | 86.3 | 13.7 | amber fluid | $4.7 \times 10^3$ |

Utilizing this starting material, compositions containing up to 95 weight percent $NbF_5$ were readily melted, although the melts were covered with thick white crusts with some particulate material suspended in the melt. However, volume resistivity values were somewhat higher with these water-containing compositions, typically in the range of about $1-5 \times 10^3$ ohm-cm.

It is also found that these compositions can be compounded with highly hydrated $NbF_5$ (2% H by weight, expressed as water), one batch composition being calculated to contain about 63% $NbF_5$, 12% $H_2O$ and 25% $P_2O_5$. Although the resulting melts are very fluid at room temperature and exhibit very low resistivities, (in the range of about 10–100 ohm-cm), they are not truly homogeneous. Melts prepared from highly hydrated $NbF_5$ typically have the appearance of white milky liquids, suggesting that some phase separation has occurred.

The deliberate addition of optional constituents other than hydrogen to the above-described composition is also possible, and can be helpful to enhance or modify selected properties of the melts. Table IV below records examples containing additions of Cl, Br, I, S, Li and B which formed electrically conductive liquids at room temperature. All of these compositions were substantially water-free. The compositions are reported in weight percent on an elemental basis, with the appearance of each melt also being recorded.

TABLE IV

| Elements | 11 | 12 | 13 | 14 | 15 | 16 | 17 |
|---|---|---|---|---|---|---|---|
| Nb | 39.2 | 37.1 | 35.4 | 37.4 | 33.1 | 37.4 | 37.0 |
| F | 37.2 | 35.4 | 33.7 | 38.2 | 46.4 | 42.4 | 34.9 |
| P | 8.7 | 8.2 | 7.8 | 11.7 | 10.2 | 7.0 | 11.1 |
| O | 11.2 | 10.6 | 10.1 | 12.1 | 9.9 | 12.1 | 15.0 |
| Cl | 3.9 | — | — | — | — | — | — |
| Br | — | 8.5 | — | — | — | — | — |
| I | — | — | 12.8 | — | — | — | — |
| S | — | — | — | — | — | — | 2.0 |
| Li | — | — | — | 0.7 | 0.4 | 0.4 | — |
| B | — | — | — | — | — | 0.6 | — |
| Melt Appearance | yellow liquid | brown liquid | black liquid | milky liquid | amber liquid | milky liquid | dark liquid |

Composition 17 from Table IV above is of particular interest because it reacts spontaneously at room temperature to form a melt, and exhibits a room temperature electrical resistivity lower than that of an unsubstituted analog composition consisting only of $NbF_5$ and $P_2O_5$.

The Drawing consists of a log resistivity plot for a melt corresponding in composition to that of Melt 17 in Table IV (having the molar composition $Nb_{51}P_{48}F_{235}S_8O_{120}$) and a melt of very similar composition but containing no sulfur (having a molar composition $Nb_{50}P_{50}F_{250}O_{125}$). The plot covers log resistivity over the range from about 20°–65° C., as measured at 100 KHz. The significantly lower resistivity of the sulfur-containing analog is evident from these data.

Electrochemical cells utilizing molten $NbF_5$-$P_2O_5$ as a liquid cell electrolyte were fabricated and tested, these cells incorporating a lithium anode and a carbon monofluoride cathode, and having a theoretical open circuit voltage of 4.87 volts. The cells demonstrated rechargeable behavior and exhibited open circuit voltages as high as 4.1 volts.

I claim:

1. A composition consisting essentially, in weight percent, of about 65–95% of a pentavalent metal fluoride selected from the group consisting of $NbF_5$ and $TaF_5$, 5–25% $P_2O_5$, at least 85% total of $NbF_5 + TaF_5 + P_2O_5$ and, as optional constituents, up to about 15% total of one or more halogens selected from the group consisting of Cl, Br and I, up to about 2% total of the group consisting of Li and B, and up to about 3% S.

2. A composition in accordance with claim 1 wherein the pentavalent fluoride consists essentially of $NbF_5$.

3. A composition in accordance with claim 2 which includes hydrogen in an amount ranging up to about 2% by weight.

4. An electrochemical device containing an electrolyte having the composition of claim 2.

* * * * *